Sept. 12, 1967 J. C. WHITE 3,341,238
STERILIZATION INDICATING DEVICES AND METHOD
OF SECURING LEADER STRING THERETO
Filed Jan. 27, 1967 2 Sheets-Sheet 1
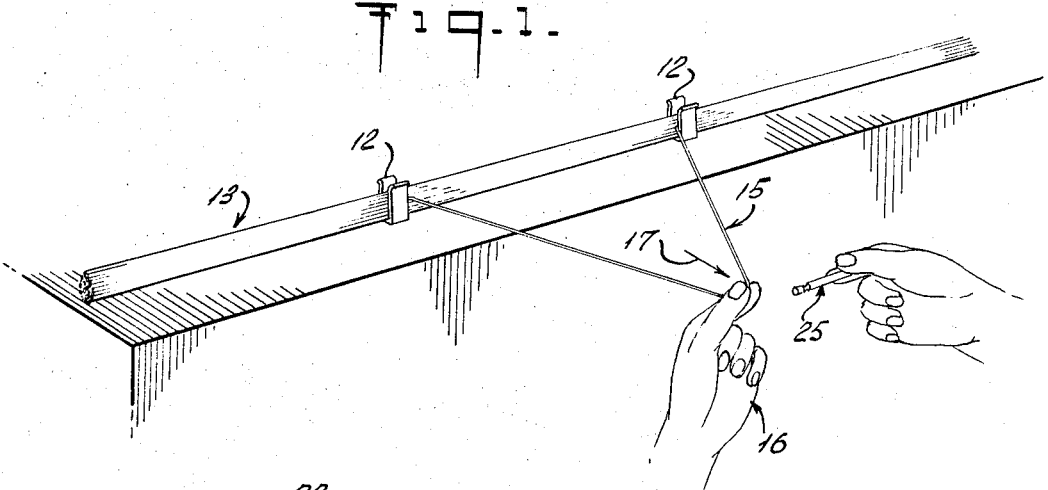
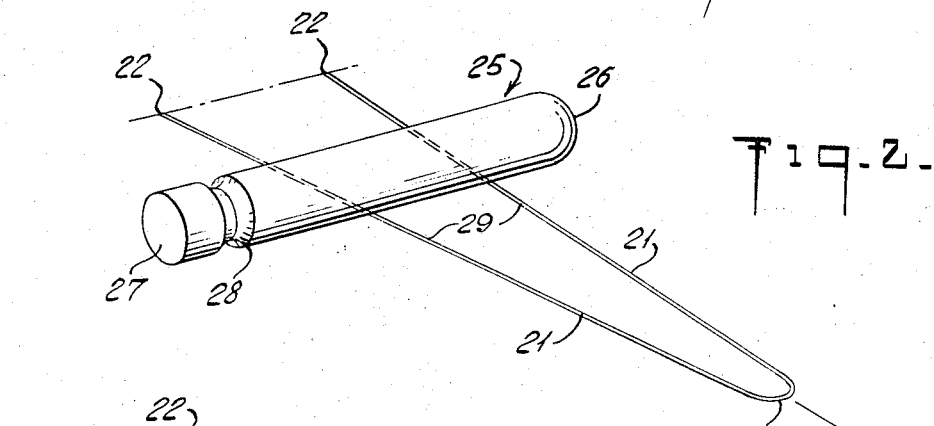
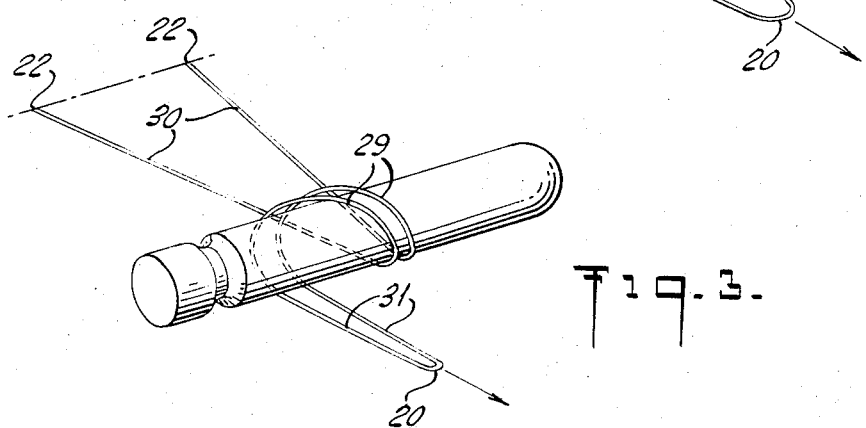
INVENTOR.
JAMES C. WHITE
BY Blum, Moscovitz,
Friedman, Blum & Kaplan
ATTORNEYS Sept. 12, 1967 J. C. WHITE 3,341,238
STERILIZATION INDICATING DEVICES AND METHOD
OF SECURING LEADER STRING THERETO
Filed Jan. 27, 1967 2 Sheets-Sheet 2
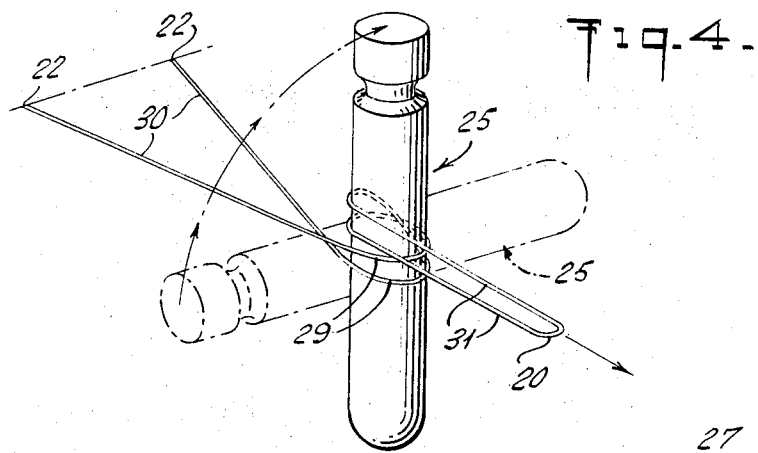
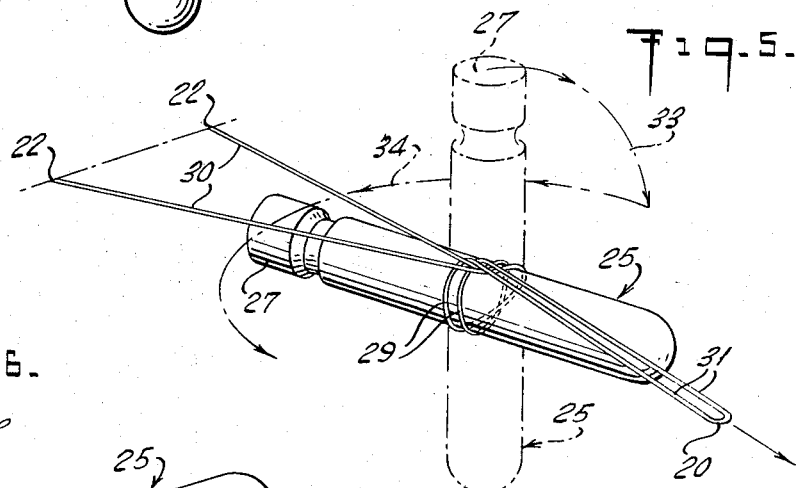
INVENTOR.
JAMES C. WHITE
BY Blum, Moscovitz,
Friedman, Blum & Kaplan
ATTORNEYS

1

3,341,238
STERILIZATION INDICATING DEVICES AND METHOD OF SECURING LEADER STRING THERETO
James C. White, Bronx, N.Y., assignor to Propper Manufacturing Company, Inc., Long Island City, N.Y., a corporation of New York
Substituted for abandoned application Ser. No. 267,640, Mar. 25, 1963. This application Jan. 27, 1967, Ser. No. 622,850
3 Claims. (Cl. 289—1.5)

ABSTRACT OF THE DISCLOSURE

An improved arrangement for securing a leader string to an autoclave control tube to facilitate mass production. The leader string is retained in a fixture and by a series of manual operations, the string is secured to a circumferential groove provided at one end of the control tube.

This invention relates generally to the securement of a leader string to an object, such as a vial or tube, and is particularly concerned with the arrangement of a leader string secured to an autoclave control tube, and the method of making such securement.

It is known in the art to provide autoclave sterilization control tubes for location in an autoclave during use, and having a composition therein for positively indicating whether sterilization has been accomplished. Such tubes may be glass vials and are each provided with a leader or string securely attached to the vial and extending therefrom for location exteriorly of an autoclave during operation. The control device may then be conveniently handled by the distal string region.

Heretofore, in the manufacture of such autoclave controls, considerable labor and cost has been involved in the attachment of strings to the tubes. Such difficulties have contributed substantially to the necessary selling price of these autoclave controls.

Accordingly, it is an important object of the present invention to provide a highly improved method for attaching leader strings to autoclave control tubes, which greatly reduces the time and labor cost of such operation, and thereby effects considerable savings in manufacture to permit of a lower selling price.

It is a more particular object of the present invention to provide an improved arrangement of string securement to a body of tube which is highly effective for its intended use, and capable of quick and easy manual production at a minimum of cost.

Other objects of the present invention will become apparent upon reading the following specification and referring to the accompanying drawings, which form a material part of this disclosure.

The invention accordingly consists in the features of construction, and combinations and arrangements of parts and method steps, which will be exemplified in the construction hereinafter described, and of which the scope will be indicated by the appended claims.

In the drawings:

FIGURE 1 is a top perspective view showing an initial stage in practice of the instant method;

FIGURE 2 is a perspective view similar to FIGURE 1, somewhat enlarged and showing a slightly later stage of the method;

FIGURE 3 is a perspective view similar to FIGURE 2 and illustrating a further stage of the instant method;

FIGURE 4 is a perspective view similar to FIGURES 2 and 3 and illustrating a method step subsequent to that of FIGURE 3;

2

FIGURE 5 is a perspective view similar to FIGURE 4 and illustrating a method step subsequent to the latter figure;

FIGURE 6 is a perspective view similar to FIGURE 5 and illustrating a later step in the instant method, while FIGURE 7 is a perspective view showing the finished product of the instant method.

Referring now more particularly to the drawings, and specifically to FIGURE 1 thereof, a fixture or stand is generally designated 10, having a generally horizontal upper surface 11. Provided on the upper stand surface 11 and upstanding therefrom may be a pair of spaced anchors or holding clips 12. The clips 12 are adapted to frictionally engage and retain a bundle of separate leader strings 13, with the leader strings extending through and beyond both clips.

A single string 15 is shown distended from the bundle 13 by an operator's hand 16. The mode of distention is by drawing a medial region of the string 15 laterally away from the bundle 13 in the direction of arrow 17, but leaving the free ends of the string 15 frictionally held by respective clips 12, to effectively double or fold the string.

Thus, as shown in FIGURE 2, the string 15 is distended or doubled to define thereof a bight 20 and a pair of legs 21 extending from the bight and terminating in respective free ends 22 held by the clips 12 (not shown in FIGURE 2). The bight 20 and legs 21 may thus define a generally U-shaped configuration and lie in a substantially horizontal plane.

An elongate body or tube generally designated 25, may be an autoclave control tube, such as a glass vial or the like having opposite ends 26 and 27, and formed adjacent to and spaced inward from the latter end with an external, circumferential groove 28.

The body or tube 25 may be superposed transversely across leg portions 29 spaced intermediate the bight 20 and free ends 22. In the illustrated embodiment, the tube ends 26 and 27 extend laterally beyond the intermediate leg portions 29, and the tube end 27 is shown as extending leftward.

The bight 20 is next wound or coiled about the tube 25, intermediate the tube end 26 and groove 28. This effectively wraps the intermediate leg portions 29 about the tube in a single spiral convolution, with the spiral progressing toward the tube end 27 in the direction of the bight 20. The single spiral or helical convolution of intermediate leg portions 29 leave the remaining pairs of leg portions 30 and 31 extending generally tangentially in opposite directions from the underside of the tube 25. That is, the remaining pair of leg portions 30 extend tangentially from the underside of tube 25 toward the free string ends 22 retained by the clips 12 of the fixture 10, while the pair of remaining leg portions 31 extend tangentially from the underside of the tube in the opposite direction, away from the retained string ends 22 and terminate at the bight 20. Further, the remaining pair of leg portions 31 are located adjacent to the tube 27 as compared to the remaining pair of leg portions 30, being between the latter and the groove 28.

While the string 15 is described herein as including a pair of legs 21 extending between the bight 20 and free ends 22, it is, of course, appreciated that the string may be considered as being doubled or folded about the bight 20, with the intermediate region of the doubled string wrapped about the tube 25, as shown in FIGURE 3.

In FIGURE 4 the tube 25 is being shown as rotated approximately 90 degrees from its phantom position to its solid-line position. This rotation of the tube 25 is generally in a plane normal to the tangential directions of the oppositely extending remaining string portions 30 and 31, and continues another 90 degrees as shown by the arcuate arrows 33 in FIGURE 5. As thus far described, the tube 25 has been rotated approximately 180 degrees in a plane generally normal to the oppositely directed tangential remaining string portions 30 and 31, to locate the tube end 27 and adjacent groove 28 on the right-hand side.

The free string ends 22 remain fixed, and the intermediate string portion 29 wrapped about the tube rotates with the tube, as may the remaining string portion 31 and bight 20. This effects a twisting of the pair of leg portions 30, and serves to locate the leg portions 30 and 31 as extending in opposite directions tangentially of the tube, but now from the upper side thereof.

Further regarding FIGURE 5, the tube 25 is rotated in a generally horizontal plane, parallel with and below the plane of the remaining string portions 30 and 31 approximately 180 degrees about a generally vertical axis, as indicated by the arrow 34. The free string ends 22 are still retained by the clips 12, and the bight 20 is held in the direction of arrow 35, so that the tube movement in the direction of arrow 34 effects twisting together of the remaining string portions 30 and 31 adjacent to the intermediate or wrapped string portion 29. Also, the tube end 27 again returns leftward upon tube movement in the direction of arrow 34, to the position shown in FIGURE 6.

In FIGURE 6 the bight or loop 20 is shown as having been engaged over the remaining string portions 30 and about the tube end 27.

It remains only to draw the string up tightly about the tube 25, advantageously simultaneously guiding the string into the groove 28 to achieve the final product shown in FIGURE 7. That is, from the condition of FIGURE 6, the tube 25 and free string ends 22 are pulled away from each other while the string is guided into the groove 28.

The free string ends 22 may then be removed from the clips 12 to extend freely from the tube 25, being firmly anchored thereto by the string arrangement described hereinbefore.

Thus, it will now be appreciated that the doubled leader string 15 has had its intermediate portion wrapped spirally about the tube 25, the remaining portions of the doubled string being twisted together, and the loop or bight extended over the remaining string portions and about an end of the tube. This string arrangement has proved admirably satisfactory, both in greatly simplifying and reducing the cost of production, and in use of the autoclave control tubes.

Although the present invention has been described in some detail by way of illustration and example for purposes of clarity of understanding, it is understood that certain changes and modifications may be made within the spirit of the invention and scope of the appended claims.

I claim:
1. In the method of securing a leader string to an elongate body, the steps which comprise: providing a string having a free bight and legs extending from the bight to secured ends, winding the bight about the body to spirally wrap an intermediate portion of the legs around the body with the remaining leg portions extending tangentially from one side of the body in opposite directions, one pair of remaining leg portions extending to the bight and the other pair of remaining leg portions extending to the string ends, turning said body together with the wrapped intermediate leg portions and said one pair of remaining leg portions and bight approximately 180 degrees in a plane generally normal to said opposite directions to twist said other pair of remaining leg portions, turning said body and said wrapped intermediate leg portions approximately 180 degrees in a plane generally parallel to said remaining leg portions and in a direction to twist said pairs of remaining leg portions and to engage said one pair of remaining leg portions over said other pair of remaining leg portions, engaging said bight about said body and drawing said string up tightly about said body.

2. The method of securing a leader string to a body according to claim 1, wherein the body has a circumferential groove and further characterized in drawing said string up tightly about said body within said groove.

3. An autoclave control tube having a circumferential external groove, and a doubled string having a bight and legs extending from the bight, said doubled string having portions of its legs wrapped about said tube within said groove, and said bight being engaged about said tube within said groove according to the method claimed in claim 2.

References Cited

UNITED STATES PATENTS

| 1,788,104 | 1/1931 | Hargreaves | 21—61 |
| 3,114,349 | 12/1963 | Schuman | 21—2 XR |

OTHER REFERENCES

Gibson, Charles E.: Handbook of Knots and Splices, Emerson Books, Inc., New York, 1961, 1963 (Library of Congress catalog card No. 63–8697) (pp. 42 and 43).

JOSEPH SCOVRONEK, *Acting Primary Examiner.*

J. ZATARGA, *Assistant Examiner.*